United States Patent
Bao et al.

(10) Patent No.: US 7,110,539 B1
(45) Date of Patent: Sep. 19, 2006

(54) METHOD AND APPARATUS FOR ENCRYPTING AND DECRYPTING DATA

(75) Inventors: Feng Bao, Singapore (SG); Huijie Robert Deng, Singapore (SG)

(73) Assignee: Kent Ridge Digital Labs, Singapore (SG)

( * ) Notice: Subject to any disclaimer, the term of this patent is extended or adjusted under 35 U.S.C. 154(b) by 0 days.

(21) Appl. No.: 09/937,634

(22) PCT Filed: Mar. 22, 1999

(86) PCT No.: PCT/SG99/00020

§ 371 (c)(1),
(2), (4) Date: Sep. 24, 2001

(87) PCT Pub. No.: WO00/57595

PCT Pub. Date: Sep. 28, 2000

(51) Int. Cl.
*H04L 9/00* (2006.01)
*H04K 1/04* (2006.01)

(52) U.S. Cl. .................. 380/28; 380/37; 380/259; 380/268

(58) Field of Classification Search .............. 380/28, 380/29, 259, 44
See application file for complete search history.

(56) References Cited

U.S. PATENT DOCUMENTS

| | | | | |
|---|---|---|---|---|
| 4,731,843 A | * | 3/1988 | Holmquist | 380/29 |
| 4,747,139 A | * | 5/1988 | Taaffe | 380/44 |
| 5,412,730 A | * | 5/1995 | Jones | 380/46 |
| 5,548,648 A | * | 8/1996 | Yorke-Smith | 713/193 |
| 5,664,016 A | | 9/1997 | Preneel et al. | 380/28 |
| 5,677,956 A | * | 10/1997 | Lafe | 380/28 |
| 5,799,088 A | * | 8/1998 | Raike | 380/30 |
| 5,875,247 A | * | 2/1999 | Nakashima et al. | 705/52 |
| 5,956,402 A | * | 9/1999 | Vo | 380/277 |
| 6,505,170 B1 | * | 1/2003 | Seifert et al. | 705/21 |
| 6,628,786 B1 | * | 9/2003 | Dole | 380/44 |
| 6,751,319 B1 | * | 6/2004 | Luyster | 380/37 |
| 2001/0042043 A1 | * | 11/2001 | Shear et al. | 705/51 |

FOREIGN PATENT DOCUMENTS

| | | |
|---|---|---|
| EP | 0 676 876 A1 | 11/1995 |
| JP | 10-178421 | 6/1998 |
| WO | WO96/08912 | 3/1996 |

OTHER PUBLICATIONS

*Markov Ciphers and Differential Cryptanalysis*, X. Lai et al. (p. 18-38).
*Safer K-64: One Year Later*, J. L. Massey (p. 212-241).
*The RC5 Encryption Algorithm*, R. L. Rivest ( 11 p.).
*American Nation Standard For Data Encryption Algorithm*, American National Standards Institute, ANSI X3.932-1981, Dec. 30, 1980 (9 double-sided pages).

* cited by examiner

*Primary Examiner*—Kambiz Zand
(74) *Attorney, Agent, or Firm*—Conley Rose, P.C.

(57) ABSTRACT

A method and apparatus for encrypting and decrypting data is disclosed which employs two or more cryptographic algorithms to achieve high throughput without compromising security. The invention is especially useful for software implementation to protect large amounts of multimedia data over high-speed communication channels.

46 Claims, 2 Drawing Sheets

METHOD AND APPARATUS FOR ENCRYPTING AND DECRYPTING DATA

FIELD OF THE INVENTION

Figure 1:
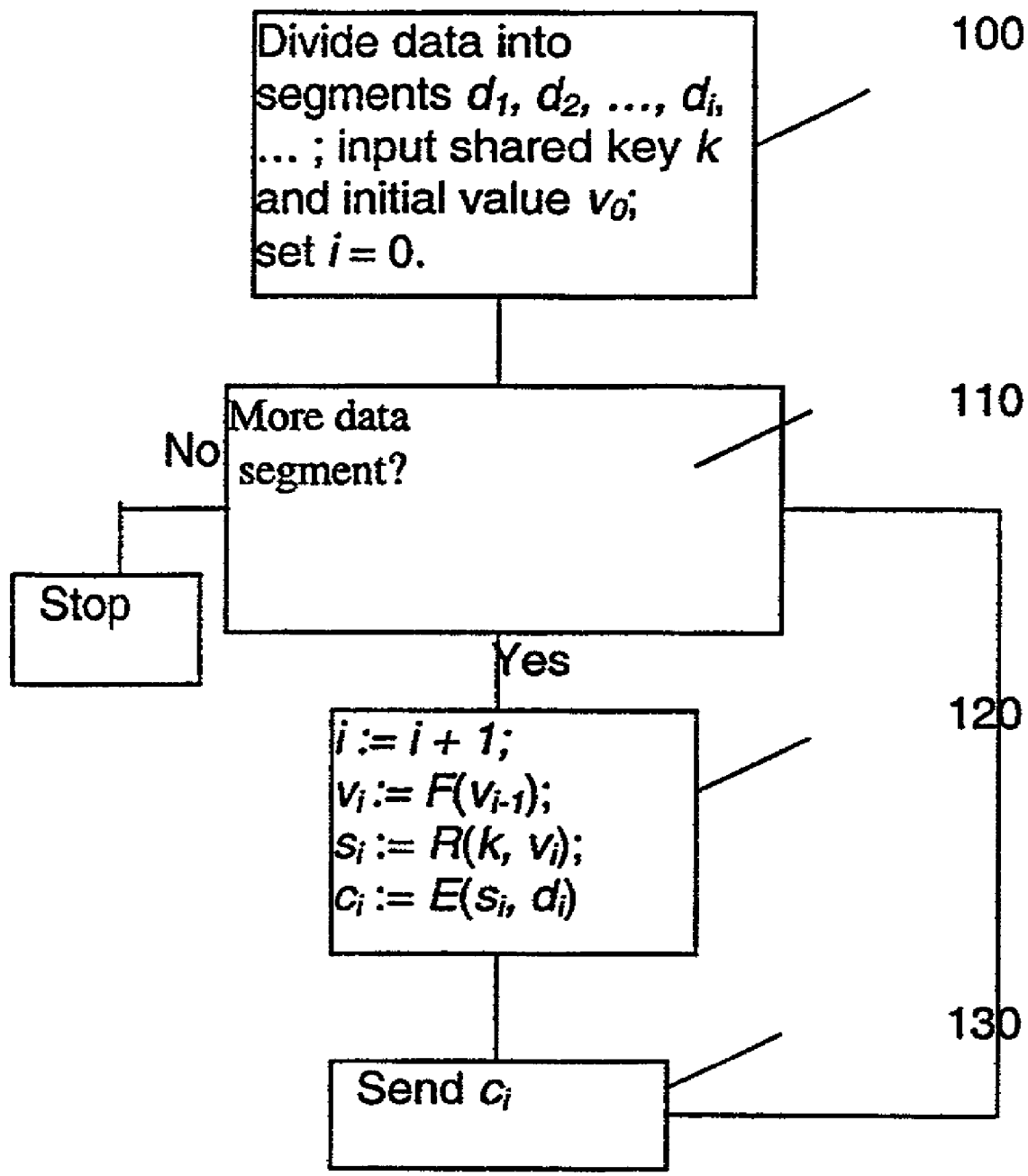

The present invention relates to cryptography and in particular to a method and apparatus for encrypting and decrypting digital data for the purpose of protecting or securing its contents.

BACKGROUND OF THE INVENTION

There exists a need to transfer data confidentially over an open channel or to store such data securely in an unsecure location. Whilst such transfer or storage may be achieved by physical means, it is more effective and/or flexible to use cryptographic means.

In the prior art, to send private communications between two parties, the parties need to share a cryptographic key and use a symmetric-key cipher to encrypt and decrypt data. Various ciphers including block ciphers and stream ciphers have been proposed in the past. A stream cipher handles messages of arbitrary size by ciphering individual elements, such as bits or bytes of data. This avoids the need to accumulate data into a block before ciphering as is necessary in a block cipher. A conventional block cipher requires an accumulation of a certain amount of data or multiple data elements for ciphering to complete. Examples of block ciphers include DES (see ANSI X3.92, "American National Standard for Data Encryption Algorithm (DEA)," American National Standards Institute, 1981), IDEA (see X. Lai, J. Massey, and S. Murphy, "Markov ciphers and differential cryptanalysis," Advances in Cryptology—EUROCRYPT '91 Proceedings, Springer-Verlag, 1991, pp. 17–38), SAFER (see J. Massey. SAFER K-64: One year later. In B. Preneel, editor, Fast Software Encryption—Proceedings of Second International Workshop, LNCS 1008, pages 212–241, Springer Verlag, 1995), and RC5 (see R. Rivest, "The RC5 encryption algorithm," Dr. Dobb's Journal, Vol. 20, No. 1, January 1995, pp. 146–148). A typical data encryption speed for these ciphers is several million bits per second (Mb/s) on a Pentium 266 MHz processor.

Due to the pervasiveness of high-speed networking and multimedia communications, the demand for high-speed ciphers is ever increasing. For example, data rates over Asynchronous Data Transfer networks range from several tens of Mb/s to 1 Gb/s. Software implementations of existing block ciphers cannot reach these kinds of data rates.

In general, stream ciphers are much faster than block ciphers. However, stream ciphers are usually not sufficiently analyzed and are perceived to be weaker in security than block ciphers. Many stream ciphers that we believed to be very secure were subsequently broken. The design of secure and efficient high-speed ciphers remains a highly challenging problem.

Many powerful cryptanalytical methods have been developed during the past decade or so. It may be observed that the success of many of these methods in attacking a cipher depends on the availability of a large quantity of ciphertexts/plaintenxts under a particular encryption key. Normally, the likelihood of successfully attacking a cipher, i.e., discovering the key, diminishes as the amount of available ciphertexts/plaintexts decreases. The present invention, is motivated by the above observation, and provides an improved method and apparatus for data encryption and decryption.

SUMMARY OF THE INVENTION

The method of the present invention may employ a combination of at least two cryptographic algorithms to achieve relatively high throughput without compromizing security. A first algorithm may be a cryptographic pseudo random sequence (or number) generator with strong security, and a second algorithm may be a cipher capable of high-speed operation, but may be weak in security when used alone. The first algorithm may be used to systematically and periodically generate "segment keys" and the second algorithm may be used to encrypt a data segment or plaintext segment using a segment key. Each data segment may be encrypted using a different segment key. By limiting the sizes of the data segments, an attacker may not have sufficient plaintexts or ciphertexts under a given segment key to carry out meaningful cryptanalysis against the second algorithm. In doing so, the present invention may achieve high throughput in data encryption and decryption without compromising overall security of the system.

According to one aspect of the present invention there is provided a method of encrypting data suitable for sending to a decrypting party, said method including the steps of:
(a) dividing said data into data segments;
(b) accepting at least a cryptographic key k shared with the decrypting party;
(c) for the ith data segment (i=1, 2, . . . ,) to be encrypted, generating the ith segment key $s_i$ using a first function with said cryptographic key k and some accessory data strings as inputs;
(d) encrypting the ith data segment using a second function with $s_i$ as the encryption key to form the ith ciphertext segment; and
(e) outputting the ith ciphertext segment, and at least a part of said accessory data strings for sending data to the decrypting party, and if more data segments are to be encrypted, repeating steps (c), (d) and (e).

The accessory data strings may include a single string $v_i$ derived from the previous value $v_{i-1}$ in a predetermined fashion. The string $v_i$ may be derived according to the relation $v_i = F(v_{i-1})$, i=1, 2, . . . , wherein $F(\ )$ maps $v_{i-1}$ to $v_i$ and $v_o$ is an initialization value made known to the decrypting party.

According to a further aspect of the present invention there is provided a method of decrypting data encrypted by an encrypting party, said method including the steps of:
(a) accepting at least a cryptographic key k being shared with the encrypting party;
(b) for the ith ciphertext segment (i=1, 2, . . . ,) to be decrypted, generating the ith segment key $s_i$ using a first function with said cryptographic key k and some accessory data strings as inputs;
(c) decrypting the ith ciphertext segment using a second function with $s_i$ as the decryption key;
(d) outputting the decrypted ith ciphertext segment, and if more ciphertext segments are to be decrypted, repeating steps (b), (c) and (d).

According to a still further aspect of the present invention there is provided apparatus for encrypting data suitable for sending to a decrypting party, said apparatus including:
(a) means for dividing said data into data segments;
(b) means for accepting at least a cryptographic key k shared with the decrypting party;
(c) means for generating for the ith data segment (i=1, 2, . . . ,) to be encrypted, the ith segment key $s_i$ using a first function with said cryptographic key k and some accessory data strings as inputs;
(d) means for encrypting the ith data segment using a second function with $s_i$ as the encryption key to form the ith ciphertext segment; and (e) means for outputting the ith ciphertext segment, and at least a part of said accessory data strings for sending data to the decrypting party.

According to a still further aspect of the present invention there is provided apparatus for decrypting data encrypted by an encrypting party, said apparatus including:

(a) means for accepting at least a cryptographic key k being shared with the encrypting party;

(b) means for generating as inputs for the ith ciphertext segment (i=1, 2, . . . ,) to be decrypted, the ith segment key $s_i$ using a first function with said cryptographic key k and some accessory data strings;

(c) means for decrypting the ith ciphertext segment using a second function with $s_i$ as the decryption key; and (d) means for outputting the decrypted ith ciphertext segment.

The apparatus of the present invention may be conveniently embodied by means of a suitably programmed general purpose digital computer. It is well within the capability of persons skilled in the art of programming digital computers to develop software programs for implementing the encrypting/decrypting methods described herein. Alternatively the apparatus may be implemented via dedicated hardware.

DESCRIPTION OF PREFERRED EMBODIMENT

Figure 2:
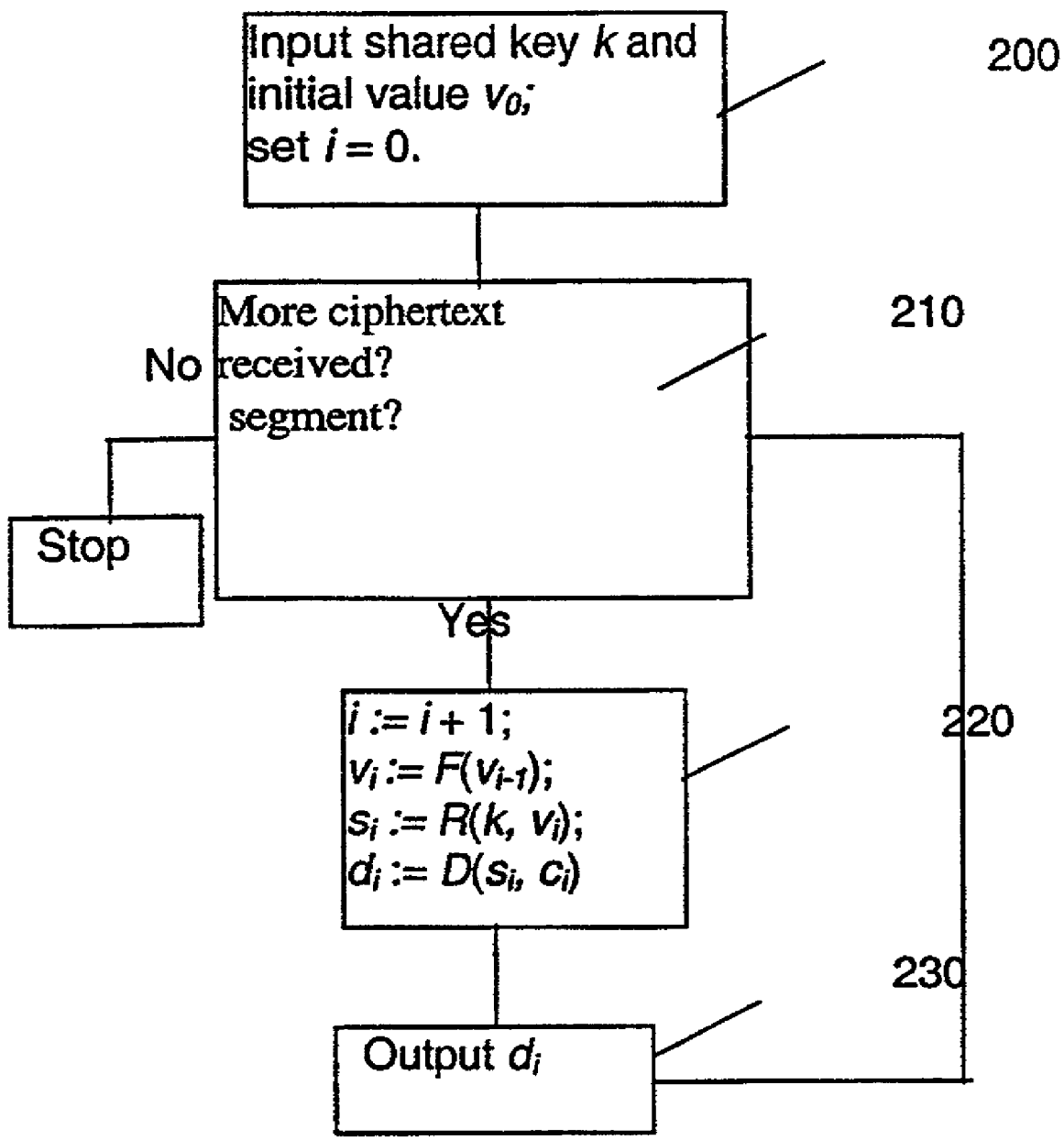

A preferred embodiment of the present invention will now be described with reference to the accompanying drawings wherein:

FIG. 1 depicts a flowchart of the operation of an illustrative embodiment of the present invention at the data encrypting end of a communication channel; and FIG. 2 depicts a flowchart of the operation of an illustrative embodiment of the present invention at the data decrypting end of a communication channel.

FIG. 1 shows the operation of the present invention at the encrypting end of a communication channel. Data encryption is performed using two cryptographic algorithms, the first being a cryptographic pseudo random sequence generator R( ) which is a sequence generating function and the second being a high-speed cipher E( ) which is functionally a ciphering function. The high-speed cipher may be relatively weak in security when used alone. The pseudo random sequence generator accepts two inputs k and v and outputs a pseudo random sequence s=R(k, v). The high-speed cipher accepts a secret key s and a data segment d and produces the ciphertext c=E(s, d). In addition, the illustrative embodiment uses a pre-determined function F( ) to update an initial value, i.e., $v_i = F(V_{i-1})$. It is assumed that the encrypting end and decrypting ends share a secret key k, an initial value $v_0$, and the functions F( ) and R( ). Moreover, it is assumed that the decrypting end knows the decrypting algorithm D( ) corresponding to the encrypting algorithm E( ).

As shown in FIG. 1, at step 100, a program at the encrypting end divides the data to be encrypted into segments of equal or unequal sizes: $d_1, d_2, \ldots, d_i, \ldots$. In the former case the last segment may be padded with random data if necessary; while in the latter case, the sizes of the data segments normally need to be known by the decrypting end to facilitate decryption. Furthermore, the program accepts the shared secret key k and the shared initial value $v_0$ as inputs, and sets the index i=0.

At 110, the program inspects if there is any data segment available for encryption, and if not, the program terminates. Assuming that there is a data segment available, the program, at 120, increments the index i by 1, gets an updated initial value $v_i$ using a hash function F( ) where $v_i = F(v_{i-1})$, generates a segment key $s_i = R(k, v_i)$, and uses the segment key to encrypt the data segment to get the ciphertext segment $c_i = E(s_i, d_i)$ in a manner that is well known to those skilled in the art.

At 130, the program transmits the ciphertext segment, and optionally the size of the corresponding data segment, to the decrypting end. The program then goes back to 110 to see if more data segments need to be encrypted. If so, the preceding process is repeated.

The function F( ) is used to update the initial value. One example is $v_i = v_{i-1} + 1$ and another example is a cryptographic hash function.

Those skilled in the art will see that the shared secret key is protected by the cryptographic pseudo random generator $R(k, v_i)$. To obtain good security, it is required that R( ) be secure against all known attacks to the key k. R( ) is preferably a secure one-way function or one-way hash function in k. That is, given $R(k, v_i)$ and $v_i$, it should be computationally hard to find k. One example of a pseudo random generator is a keyed one-way hash function $h(k, v_i)$ or $h(k, p, v_i, k)$ where h( ) is a one-way hash function and where p pads k to a full input block as specified by some hash functions. Examples of one-way hash functions are MD5 and SHA, (refer respectively, R. Rivest, "The MD5 message digest algorithm," IETF RFC 1321, April 1992 and National Institute of Standards and Technology, NIST FIPS PUB 186, "Digital Signature Standard," U.S. Department of Commerce, May 1994). Another example of a cryptographic pseudo random generator is a strong encryption algorithm such as IDEA with k as the encryption key, $v_i$ as plaintext, and the ciphertext output as the pseudo random sequence.

In the illustrative embodiment for encryption, the segment key $s_i$ is used by the cipher E( ) to encrypt only one data segment $d_i$. This implies that only the corresponding ciphertext segment $c_i$ and in some cases part of the corresponding data segment are available to an attacker to cryptanalyze the cipher. One selection criteria for E( ) is that it should be capable of operating at a high-speed. Another selection criteria for E( ) is that given the limited amount of ciphertexts and even part of the corresponding data segment under a segment key, the cipher E( ) should be capable of resisting all known attacks. As a consequence, there is a tradeoff between the size of the data segment and system throughput; the larger the size of a data segment, the higher the throughput. On the other hand, a larger data segment implies that more ciphertexts or plaintexts under a segment key are available to an attacker to cryptanalyze the cipher E( ). Examples of E( ) are high-speed stream ciphers or block ciphers with fewer rounds of iterations than that when they are used alone. In the latter case, the notation $E(s_i, d_i)$ represents the encryption of data segment $d_i$ using a block cipher even when the size of the data segment $d_i$ is larger than the block size of the underlying block cipher and the encryption may be performed in various modes, such as Electronic Code Book or Cipher Block Chaining Mode.

One specific example of E( ) is the following high-speed stream cipher. Let N( ) be a function defined as $N(s,x) = ((((x+s_1) \oplus s_2) \times s_3 \oplus s_4) >>>$, where $s = s_1 s_2 s_3 s_4$ (consisting of four 32-bit strings) is a 128 bit secret key, x is a 32-bit string, $\oplus$ is the bit-wise exclusive-or, + and × are mod $2^{32}$ addition and multiplication, and >>> is to reverse a 32 bit string into opposite ranking. Let $b_1 b_2 \Lambda\, b_m \Lambda$ be the data to be encrypted which is a concatenation of 32 bit strings, the corresponding ciphertexts are given by $d_i = b_i \oplus N(s, N(s, N(s, d_{i-1}) \oplus b_{i-1}) \oplus d_{i-2})$, where the initial values $d_{-1}, d_{-2}, d_{-3}$ can be set to $s_2, s_3, s_4$.

Another specific example of E( ) is Serpent with a reduced number of rounds. Serpent is a block cipher with 128 bit block length, variable key lengths, and 32 rounds of operations (see R. Anderson, E. Biham, and L. Knudsen, "Serpent: A Proposal for the Advanced Encryption Standard", http://www.ci.cam.ac.uk/~ria14/serpent.html). Its inventors showed that to attack 6 round Serpent successfully, it would require $2^{56}$ and $2^{116}$ plaintext blocks using linear and differential cryptanalysis, respectively. Hence, if a 6 round Serpent is used as E( ) to encrypt data, it should resist both linear and differential cryptanalysis as long as the data segment size is less than $2^{56}$ 128 bit blocks. At the same time, this E( ) is about 5 times faster than the 32 round Serpent.

FIG. 2 depicts a flowchart of the operation of the present invention at the data decrypting end of a communication channel. As shown in FIG. 2, at step 200, a program at the decrypting end accepts the shared secret key k and the shared initial value $v_0$ as inputs, and sets the index i=0.

The program then checks at 210 to see if there is any ciphertext segment available for decryption and if not, the program halts its operation. Assuming that a ciphertext segment is received, the program, at 220, increments the index i by 1, updates the initial value $v_i=F(v_{i-1})$, computes a segment key $s_i=R(k, v_i)$, and uses the segment key to decrypt the ciphertext segment to get the data segment $d_i=D(s_i, c_i)$ in a fashion that is well known in the art.

As shown at 230, the program preferably outputs the data segment and then goes back to 210 to see if there is more ciphertext segment available for decryption. If so, the preceding steps are repeated.

The embodiment described above is merely one illustrative example of realizing the present invention; there can be many variants of this. For example, it is well within the capability of persons skilled in the art to suggest alternative ways of generating segment keys using a pseudo random generator, where the current segment key may depend not only on the cryptographic key k, but also on other variables such as part of the plaintext, part of the ciphertext, a time stamp, and previous segment keys.

Finally, it is to be understood that various alterations, modifications and/or additions may be introduced into the constructions and arrangements of parts previously described without departing from the spirit or ambit of the present invention.

The invention claimed is:

1. A method of encrypting data suitable for sending to a decrypting party, said method including the steps of:
   (a) dividing said data into data segments;
   (b) accepting at least a cryptographic key k shared with the decrypting party;
   (c) generating the ith segment key $s_i$ for each corresponding ith data segment (i=1, 2 . . . ,) to be encrypted, the ith segment key $s_i$ being generable using a sequence generating function with said cryptographic key k and some accessory data strings as inputs;
   (d) encrypting the ith data segment using a ciphering function with $s_i$ as the encryption key to form the ith ciphertext segment; and
   (e) outputting the ith ciphertext segment, and at least a part of said accessory data strings for sending data to the decrypting party, and if more data segments are to be encrypted, repeating steps (c), (d) and (e).

2. A method according to claim 1 wherein said accessory data strings include a single string $v_i$ derived from the previous value $v_{i-1}$ in a predetermined fashion.

3. A method according to claim 2 wherein said string $v_i$ is derived according to the relation $v_i=F(v_{i-1})$, i=1, 2, . . . , wherein F( ) is a hash function for mapping $v_{i-1}$ to $v_i$ and $v_o$ is an initialization value made known to the decrypting party.

4. A method according to claim 1 wherein step (e) includes outputting the size of the corresponding data segment.

5. A method according claim 1 wherein said sequence generating function includes a pseudo random sequence generator.

6. A method according to claim 5 wherein said pseudo random sequence generator includes a keyed hash function $h(k, v_{i1}, v_{i2}, \ldots, v_{il})$, wherein k is said cryptographic key, $(v_{i1}, v_{i2}, \ldots, v_{il})$ is said accessory data strings and l is a positive integer.

7. A method according to claim 6 wherein the keyed hash function h( ) is MD5 or SHA.

8. A method according to claim 1 wherein said accessory data strings are derived from various sources.

9. A method according to claim 8 wherein said sources include current time and date, or previous accessory data strings, or some initialization values, or at least a part of the data segments or previous ciphertext segments, or at least a part of previous segment keys.

10. A method according to claim 1 wherein said accessory data strings include two parts, one part being derived by the decrypting party in a predetermined fashion prior to decrypting said ith ciphertext segment and the other part not being derived by, and therefore being sent to, the decrypting party prior to decrypting said ith ciphertext segment.

11. A method according to claim 1 wherein said ciphering function includes an encryption function of a symmetric key cipher.

12. A method according to claim 1 wherein said ciphering function includes an encryption function of a block cipher operating in a well known mode, such as Electronic Code Book mode.

13. A method according to claim 1 wherein said ciphering function includes an encryption function resulting from combined use of more than one symmetric key cipher.

14. A method of decrypting data encrypted by an encrypting party, said method including the steps of:
   (a) accepting at least a cryptographic key k being shared with the encrypting party;
   (b) for the ith ciphertext segment (i=1, 2, . . . ,) to be decrypted, generating the ith segment key $s_i$ using a sequence generating function with said cryptographic key k and some accessory data strings as inputs;
   (c) decrypting the ith ciphertext segment using a ciphering function with $s_i$ as the decryption key;
   (d) outputting the decrypted ith ciphertext segment, and if more ciphertext segments are to be decrypted, repeating steps (b), (c) and (d).

15. A method according to claim 14 wherein said accessory data strings include a single string $v_i$ derived from the previous value $v_{i-1}$ in a predetermined fashion.

16. A method according to claim 15 wherein said string $v_i$ is derived according to the relation $v_i=F(v_{i-1})$, i=1, 2, . . . , wherein F( ) is a hash function for mapping $v_{i-1}$ to $v_i$ and $v_o$ is an initialization value made known to the encrypting party.

17. A method according to claim 14 wherein said sequence generating function includes a pseudo random sequence generator.

18. A method according to claim 17 wherein said pseudo random sequence generator includes a keyed hash function $h(k, v_{i1}, v_{i2}, \ldots, v_{il})$, wherein k is said cryptographic key, $(v_{i1}, v_{i2}, \ldots, v_{il})$ is said accessory data strings and l is a positive integer.

19. A method according to claim 18 wherein the keyed hash function h( ) is MD5 or SHA.

20. A method according to claim 14 wherein said accessory data strings include two parts, one part being derived by the decrypting party in a predetermined fashion from available sources prior to decrypting said ith ciphertext segment and the other part not being derived by, and therefore being received by, the decrypting party prior to decrypting said ith ciphertext segment.

21. A method according to claim 14 wherein said ciphering function includes a decryption function of a symmetric key cipher.

22. A method according to claim 14 wherein said ciphering function includes a decryption function of a block cipher operating in a well known mode, such as Electronic Code Book mode.

23. A method according to claim 14 wherein said ciphering function includes a decryption function resulting from a combined use of more than one symmetric key cipher.

24. Apparatus for encrypting data suitable for sending to a decrypting party, said apparatus including:
  (a) means for dividing said data into data segments;
  (b) means for accepting at least a cryptographic key k shared with the decrypting party;
  (c) means for generating for the ith data segment (i=1, 2, . . . ,) to be encrypted, the ith segment key $s_i$ using a sequence generating function with said cryptographic key k and some accessory data strings as inputs;
  (d) means for encrypting the ith data segment using a ciphering function with $s_i$ as the encryption key to form the ith ciphertext segment; and
  (e) means for outputting the ith ciphertext segment, and at least a part of said accessory data strings for sending data to the decrypting party.

25. Apparatus according to claim 24 wherein said accessory data strings include a single string $v_i$ derived from the previous value $v_{i-1}$ in a predetermined fashion.

26. Apparatus according to claim 25 wherein said string $v_i$ is derived according to the relation $v_i=F(v_{i-1})$, i=1, 2, . . . , wherein F( ) is a hash function for mapping $v_{i-1}$ to $v_i$ and $v_o$ is an initialization value made known to the decrypting party.

27. Apparatus according to claim 24 wherein said means for outputting is adapted for outputting the size of the corresponding data segment.

28. Apparatus according to claim 24 wherein said sequence generating function includes a pseudo random sequence generator.

29. Apparatus according to claim 28 wherein said pseudo random sequence generator includes a keyed hash function $h(k, v_{i1}, v_{i2}, \ldots, v_{il})$, wherein k is said cryptographic key, $(v_{i1}, v_{i2}, \ldots, v_{il})$ is said accessory data strings and l is a positive integer.

30. Apparatus according to claim 29 wherein the keyed hash function h( ) is MD5 or SHA.

31. Apparatus according to claim 24 wherein said accessory data strings are derived from various sources.

32. Apparatus according to claim 31 wherein said sources include current time and date, or previous accessory data strings, or some initialization values, or at least a part of the data segments or previous ciphertext segments, or a part of previous segment keys.

33. Apparatus according to claim 24 wherein said accessory data strings include two parts, one part being derived by the decrypting party in a predetermined fashion prior to decrypting said ith ciphertext segment and the other part not being derived by, and therefore being sent to, the decrypting party prior to decrypting said ith ciphertext segment.

34. Apparatus according to claim 24 wherein said ciphering function includes an encryption function of a symmetric key cipher.

35. Apparatus according to claim 24 wherein said ciphering function includes an encryption function of a block cipher operating in a well known mode, such as Electronic Code Book mode.

36. Apparatus according to claim 24 wherein said ciphering function includes an encryption function resulting from combined use of more than one symmetric key cipher.

37. Apparatus for decrypting data encrypted by an encrypting party, said apparatus including:
  (a) means for accepting at least a cryptographic key k being shared with the encrypting party;
  (b) means for generating as inputs for the ith ciphertext segment (i=1, 2, . . . ,) to be decrypted, the ith segment key $s_i$ using a sequence generating function with said cryptographic key k and some accessory data strings;
  (c) means for decrypting the ith ciphertext segment using a ciphering function with $s_i$ as the decryption key; and
  (d) means for outputting the decrypted ith ciphertext segment.

38. Apparatus according to claim 37 wherein said accessory data strings include a single string $v_i$ derived from the previous value $v_{i-1}$ in a predetermined fashion.

39. Apparatus according to claim 38 wherein said string $v_i$ is derived according to the relation $v_i=F(v_{i-1})$, i=1, 2, . . . , wherein F( ) is a hash function for mapping $v_{i-1}$ to $v_i$ and $v_o$ is an initialization value made known to the encrypting party.

40. Apparatus according to claim 37 wherein said sequence generating function includes a pseudo random sequence generator.

41. Apparatus according to claim 40 wherein said pseudo random sequence generator includes a keyed hash function $h(k, v_{i1}, v_{i2}, \ldots, v_{il})$, wherein k is said cryptographic key, $(v_{i1}, v_{i2}, \ldots, v_{il})$ is said accessory data strings and l is a positive integer.

42. Apparatus according to claim 41 wherein the keyed hash function h( ) is MD5 or SHA.

43. Apparatus according to claim 37 wherein said accessory data strings include two parts, one part being derived by the decrypting party in a predetermined fashion from available sources prior to decrypting said ith ciphertext segment and the other part not being derived by, and therefore being received by, the decrypting party prior to decrypting said ith ciphertext segment.

44. Apparatus according to claim 37 wherein said ciphering function includes a decryption function of a symmetric key cipher.

45. Apparatus according to claim 37 wherein said ciphering function includes a decryption function of a block cipher operating in a well known mode, such as Electronic Code Book mode.

46. Apparatus according to claim 37 wherein said ciphering function includes a decryption function resulting from a combined use of more than one symmetric key cipher.

* * * * *